(12) United States Patent
Murphy et al.

(10) Patent No.: US 10,017,093 B1
(45) Date of Patent: Jul. 10, 2018

(54) SCISSOR LIFT PLATFORM

(71) Applicants: Michael Murphy, Sour Lake, TX (US);
Eric LeBlanc, Port Arthur, TX (US);
Linda Jacoby Murphy, Sour Lake, TX (US)

(72) Inventors: Michael Murphy, Sour Lake, TX (US);
Eric LeBlanc, Port Arthur, TX (US);
Linda Jacoby Murphy, Sour Lake, TX (US)

(*) Notice: Subject to any disclaimer, the term of this patent is extended or adjusted under 35 U.S.C. 154(b) by 0 days.

(21) Appl. No.: 15/479,478

(22) Filed: Apr. 5, 2017

(51) Int. Cl.
*B60P 1/44* (2006.01)
*B66F 7/06* (2006.01)
*B65G 69/30* (2006.01)

(52) U.S. Cl.
CPC .......... *B60P 1/4414* (2013.01); *B60P 1/4485* (2013.01); *B60P 1/4492* (2013.01); *B65G 69/30* (2013.01); *B66F 7/065* (2013.01); *B66F 7/0641* (2013.01)

(58) Field of Classification Search
CPC ..... B60P 1/4414; B60P 1/4485; B60P 1/4492; B65G 69/30; B66F 7/0641; B66F 7/065
USPC ........................................................ 414/495
See application file for complete search history.

(56) References Cited

U.S. PATENT DOCUMENTS

| | | | |
|---|---|---|---|
| 3,534,874 A * | 10/1970 | Long ................. | B60P 1/4414 414/557 |
| 4,941,797 A | 7/1990 | Smillie, III | |
| 6,164,895 A * | 12/2000 | Croswell ............ | B60P 1/4485 414/462 |
| 6,183,187 B1 | 2/2001 | Ablabutyan | |
| 6,260,752 B1 | 7/2001 | Dollesin | |
| 6,293,451 B1 | 9/2001 | Lemay et al. | |
| 6,364,597 B2 * | 4/2002 | Klinkenberg ......... | B60P 1/4414 414/462 |
| 6,575,509 B1 | 6/2003 | Golden | |
| 6,725,855 B1 * | 4/2004 | Brennan ............. | A47J 37/0763 126/276 |
| 6,884,018 B1 * | 4/2005 | Dugan ................. | B60P 1/4421 414/462 |
| 6,893,203 B2 * | 5/2005 | Anderson ............. | B60P 1/44 414/467 |
| 7,249,771 B1 | 7/2007 | Brennan et al. | |
| 7,275,670 B1 | 10/2007 | Shumack | |
| 7,780,394 B1 | 8/2010 | Becker | |
| 8,474,561 B2 | 7/2013 | Allingham | |

(Continued)

OTHER PUBLICATIONS

Discount Ramps, Scooter & Wheelchair Carriers, Sep. 23, 2016 http://www.discountramps.com/wheelchair_carriers/c/3210.

*Primary Examiner* — Kaitlin S Joerger
(74) *Attorney, Agent, or Firm* — John R Casperson (57) ABSTRACT

A cargo lift for receipt by a receiver hitch according to one embodiment of the invention comprises a frame, a platform, a scissor lift mechanism, an actuator, a pair of pivot mechanisms, a pair of sliding guide members, a probe connector, and a cross bar. The scissor lift mechanism is positioned between the frame and the platform and is provided with the actuator. The pair of pivot mechanisms raises and lower the frame between ground level and receiver hitch level while maintaining the platform in a horizontal position. The pair of sliding guide members extends alongside the frame and attaches the frame to the pivot mechanisms. The probe connector is for a receiver hitch for carrying the cargo lift by a vehicle. The cross-bar is for attaching the pair of pivot mechanisms to the probe connector.

15 Claims, 6 Drawing Sheets

(56) References Cited

U.S. PATENT DOCUMENTS

| | | |
|---|---|---|
| 8,556,145 B1 | 10/2013 | Ezra |
| 8,926,253 B2 | 1/2015 | Uttech et al. |
| 8,931,994 B2 | 1/2015 | Creany |
| 9,403,469 B2 | 8/2016 | Parker |
| 2008/0100076 A1 | 5/2008 | Potts |
| 2008/0149420 A1 | 6/2008 | Cheatham |
| 2010/0038391 A1 | 2/2010 | Cumbie |
| 2010/0124479 A1* | 5/2010 | Brooks ................ B60P 1/4414 414/557 |
| 2017/0282775 A1* | 10/2017 | Ochenkowski ....... B60P 1/4442 |

* cited by examiner

SCISSOR LIFT PLATFORM

BACKGROUND OF THE INVENTION

The invention relates generally to a cargo lift system for a motor vehicle and is especially well adapted for deployment on pickup trucks.

Prior art lift systems were often complex devices that required modification to the vehicle frame and electrical system. Because of this, it was generally not practical to move such lifts from one vehicle to another. An easily movable lift would be desirable.

Also, prior art lifts generally relied solely upon the vehicle for support. This placed a fairly low practical limit on their lift capacity. A more robust lift design is needed.

Further, prior art lifts generally could not function with a vehicle tail gate in place. Recent studies suggest that removal of the tail gate harms fuel efficiency. A lift that permits the vehicle tail gate to remain in position would be more economical to use.

It is an object of the invention to provide a vehicle cargo lift that overcomes the above noted deficiencies of the prior art systems.

SUMMARY OF THE INVENTION

A cargo lift for receipt by a receiver hitch according to one embodiment of the invention comprises a frame, a platform, a scissor lift mechanism, an actuator, a pair of pivot mechanisms, a pair of sliding guide members, a probe connector, and a cross bar. The scissor lift mechanism is positioned between the frame and the platform and is provided with the actuator. The pair of pivot mechanisms raises and lowers the frame between ground level and receiver hitch level while maintaining the platform in a horizontal position. The pair of sliding guide members extends alongside the frame and attach the frame to the pivot mechanisms. The probe connector is for a receiver hitch for carrying the cargo lift by a vehicle. The cross-bar is for attaching the pair of pivot mechanisms to the probe connector for receipt by the receiver hitch.

DETAILED DESCRIPTION OF THE INVENTION

Figure 4:
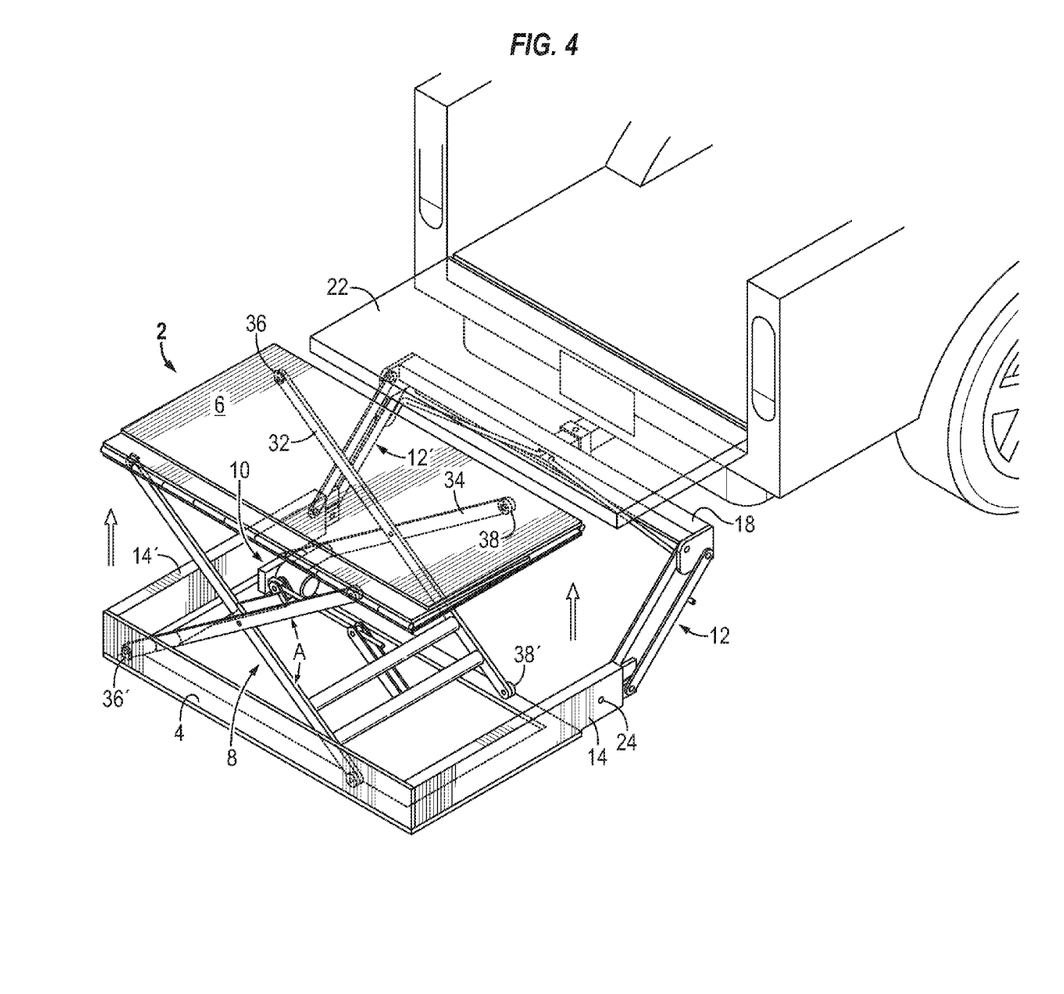
FIG. 4 is an isometric view of the cargo lift of FIG. 1 in another stage of deployment.

With reference to FIG. 4, a cargo lift 2 according to one embodiment of the invention comprises a frame 4, a platform 6, a scissor lift mechanism 8, an actuator 10, a pair of pivot mechanisms 12, 12', a pair of sliding guide members 14, 14', a probe connector 16, and a cross bar 18. The scissor lift mechanism is positioned between the frame and the platform and is provided with the actuator. The pair of pivot mechanisms raises and lowers the frame between ground level and receiver hitch level while maintaining the platform in a horizontal position. The pair of sliding guide members extends alongside the frame and attach the frame to the pivot mechanisms. The probe connector is for a receiver hitch 20 for carrying the cargo lift by a vehicle. The cross-bar is for attaching the pair of pivot mechanisms to the probe connector.

The pair of sliding guide members slides back and forth over the pivot mechanisms to adjust distance between the platform and the cross-bar. This permits the cargo lift to be used with the tailgate 22 of the vehicle in a lowered position. The pivot mechanisms are preferably of the type known in the engineering field as four-bars. In a preferred embodiment, the sliding guide members at least partly surround the four-bars to block pivot action of the four-bars until the sliding guide members are fully pulled away from the cross-bar to expose the four-bars. The sequence is shown in FIGS. 1-4. Once the sliding guide members are fully pulled out, the frame lowers to rest on the ground surface. The sliding guide members preferably carry a pin 24 (only one is shown) to prevent accidental separation from the four-bars. Another pin in the sliding guide members can be used to secure the platform for travel when it is pushed all the way forward.

A biasing means 26 (see FIG. 2) is preferably provided to partly resist the frame being lowered to ground level. Torsion bars or other spring mechanisms are suitable. In the illustrated embodiment, generally z-shaped torsion bars 30 are used. Each torsion bar has a longitudinal axis and short legs extending at right angles from the longitudinal axis. The short legs are offset by 90 degrees. The short leg on the inside end is attached to the cross-bar. A crank extends longitudinally from the short leg on the outside end and supports a four-bar.

In a preferred embodiment, the scissor lift mechanism between the frame and the platform comprises two pairs of pivotally crossed bars 32, 34 that cross at a variable angle A, each bar having a pivotally affixed end 36, 36' and a rolling end 38, 38'. The actuator for the scissor lift mechanism comprises a linear actuator that adjusts the angle to raise and lower the platform. Generally speaking, a connector bar connects the pair of scissor bars that roll or slide on the frame and the actuator pulls the connector bar from an anchor point on the frame.

In further detail of the preferred embodiment, the crossbar has a first end, a second end and a mid section. The mid section is connected to the first end of the probe connector. The probe connector extends generally at a right angle from the crossbar.

Figure 1:
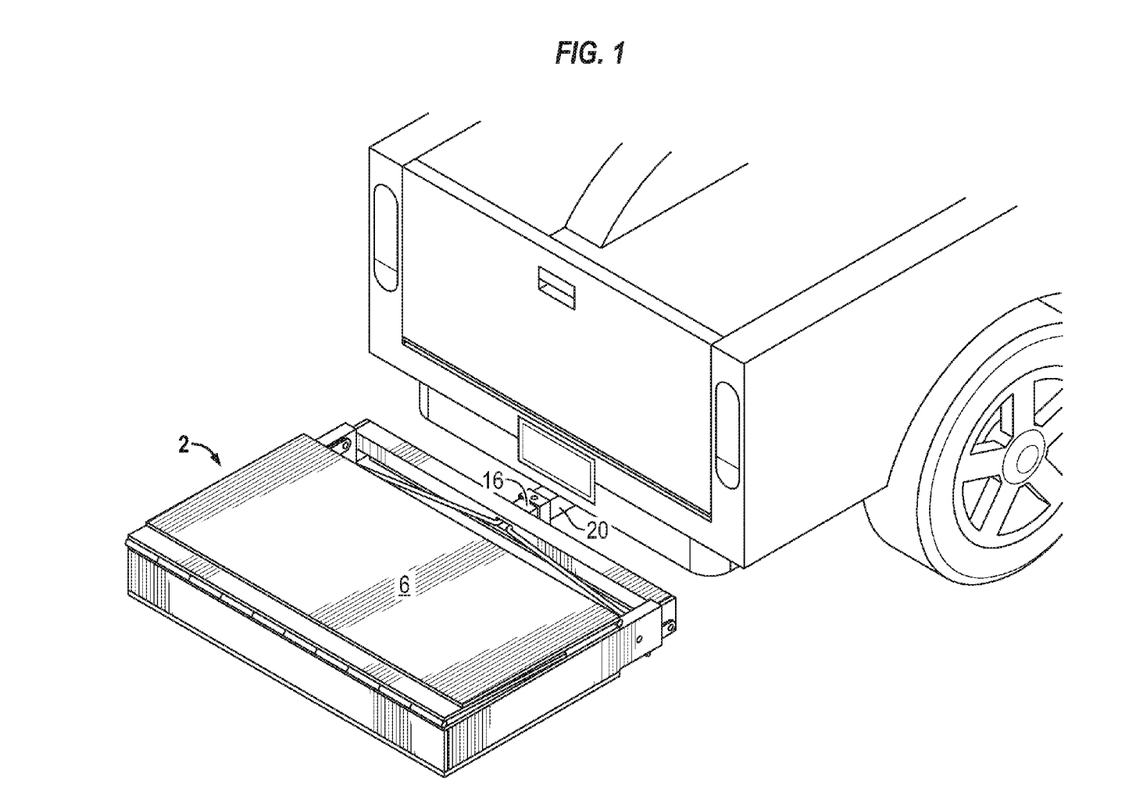
FIG. 1 is an isometric view of a cargo lift according to an embodiment of the invention in transport configuration.
Figure 2:
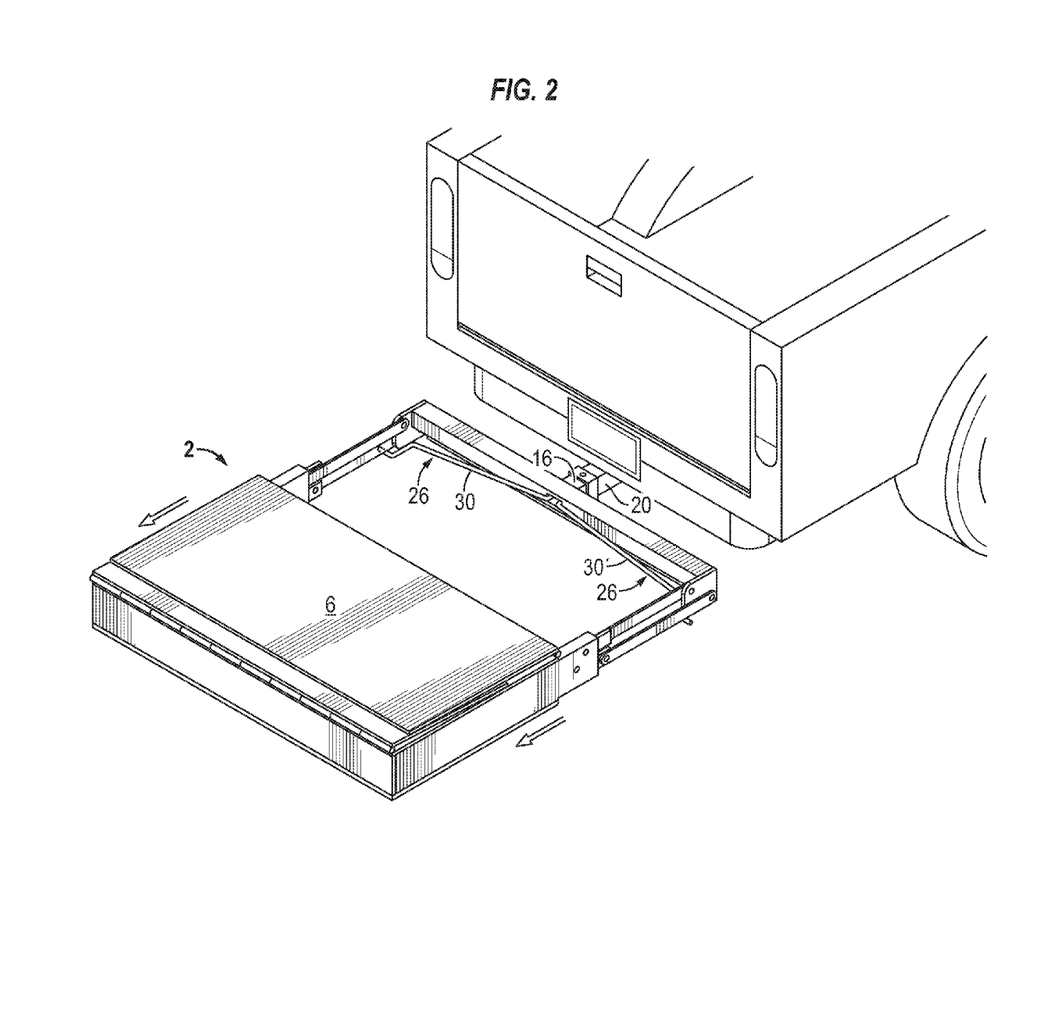
FIG. 2 is an isometric view of the cargo lift of FIG. 1 in a first stage of deployment.
Figure 3:
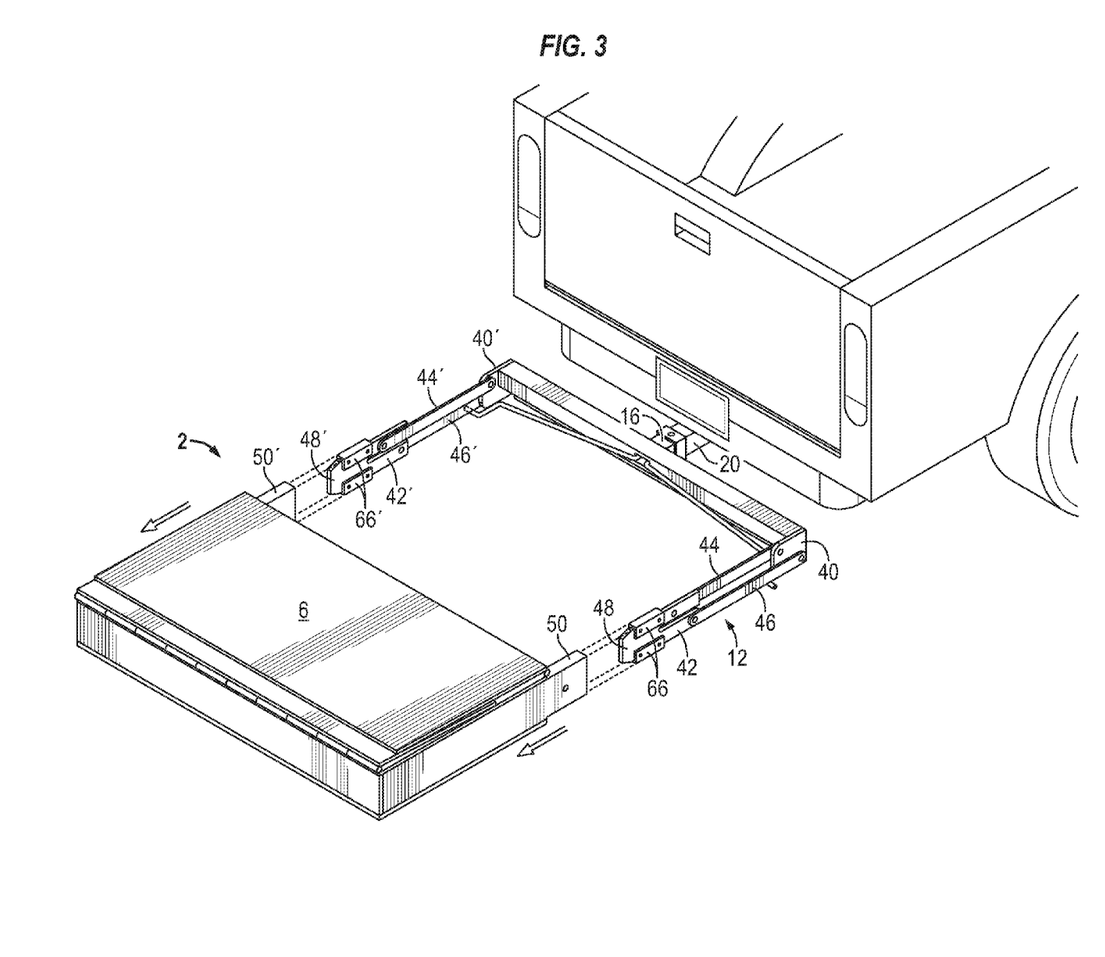
FIG. 3 is a partially exploded isometric view of the cargo lift of FIG. 2.

With reference to FIG. 3, the pivot mechanism 12 comprises a first four-bar attached to the first end of the crossbar. The first four-bar comprises a first linkage 40, a second linkage 44, a third linkage 42 and a fourth linkage 46, pivotally connected. The first and third linkages are in the form of a first bracket and a second bracket. The second and fourth linkages are in the form of elongated parallel bars. The first bracket of the first four-bar is attached to the first end of the crossbar and the elongated parallel bars extend at a right angle to the crossbar generally in a direction opposite from the probe connector. The four-bars are configured to keep the platform level with the ground as it is lowered once it has been pulled fully from the truck.

The second pivot mechanism 12' comprises a second four-bar attached to the second end of the crossbar. The second four-bar comprises a first linkage 40', a second linkage 44', a third linkage 42' and a fourth linkage 46', pivotally connected. The first and third linkages are in the form of a first bracket and a second bracket. The second and fourth linkages are in the form of elongated parallel bars. The first bracket of the second four-bar is attached to the second end of the crossbar and the elongated parallel bars extend at a right angle to the crossbar. The elongated parallel bars of the second four-bar are parallel to the elongated parallel bars of the first four-bar.

The second bracket of each of the first and second four-bar has a pair of legs interconnected by a nose piece 48, 48'. The stop pin on the slider rides between the legs and is stopped against the nose piece. The linkages are pivotally attached to the legs so that the nose piece of each bracket extends in a direction parallel to the probe connector.

First and a second slider elements 50, 50' are mounted telescopingly on the first and the second four-bars, respectively. Each slider element is movable from a first position (see FIG. 1) in which the four-bars are immobilized to a second position in which the four-bars are released for motion in a vertical plane and the slider elements are mounted telescopingly only on the nose pieces of the second brackets of the first and second four-bars (see FIG. 4).

A frame 4 connects the first slider element to the second slider element. A platform 6 is positioned parallel to the frame. A scissor lift mechanism 8 connects the frame and the platform. An actuator 10 is operatively connected to the scissor lift mechanism to raise and lower the platform.

The first and second slider elements each has a first end and a second end. When the slider elements are in the second position, the second end of each slider element is mounted telescopingly only on the nose piece of the second brackets of the first and second four-bars. The apparatus further comprises a pin 24 mounted at least partially through at least one of the slider elements near the second end to stop against a portion of the second bracket and limit travel of the slider elements.

A biasing means 26 connects the cross-bar and at least one of the four-bars to bias the four-bars toward a configuration parallel to the probe connector. The biasing means help raise the lift for transport. In a preferred embodiment, the biasing means comprises a pair of torsion bars 30, 30' each having a first end arm connected to the cross-bar and a second end arm contacting a four-bar linkage.

The scissor lift mechanism comprises two pairs of pivotally crossed bars 32, 34 crossing each other at a variable angle A, one bar of each pair being pivotally connected to the frame, the other bar of each pair being pivotally connected to the platform. The other end of each bar slides or rolls under the action of the actuator.

Figure 5:
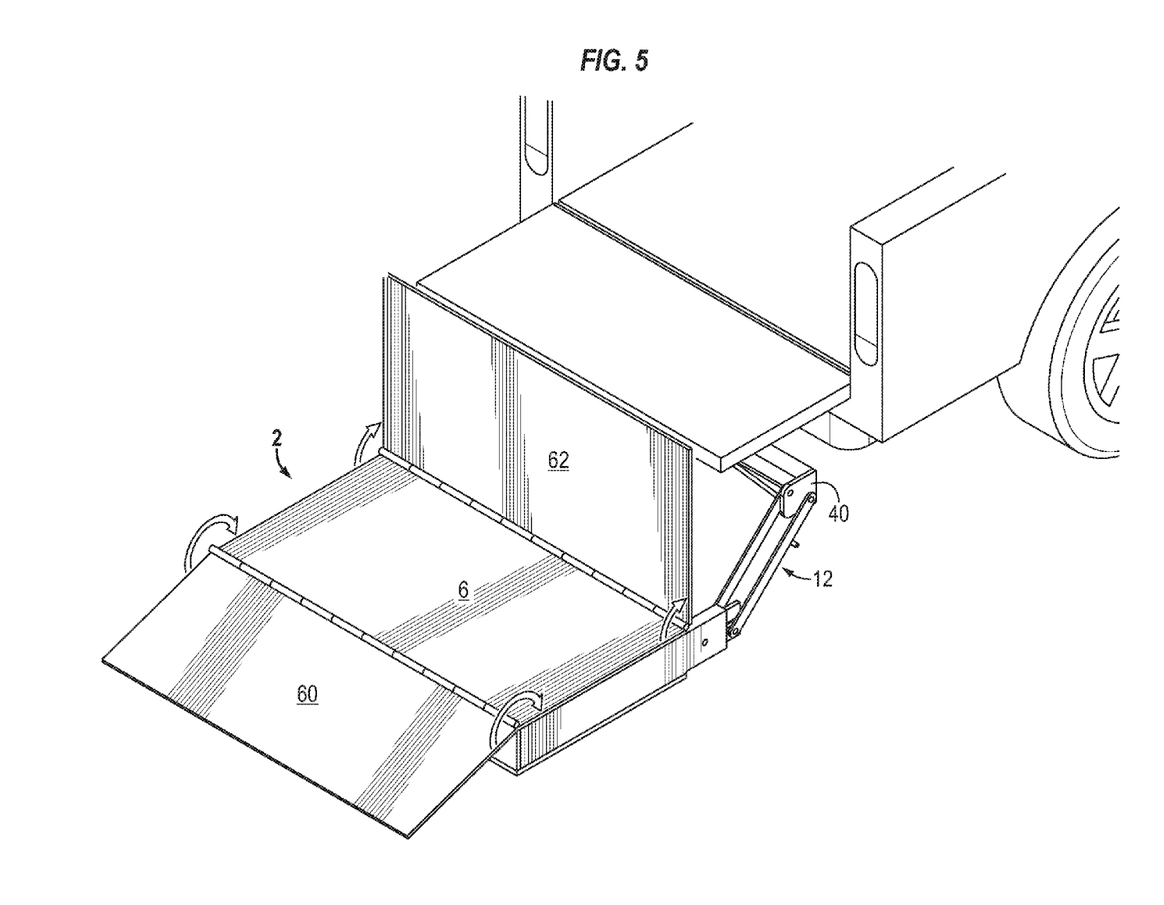
FIG. 5 is an isometric view of the cargo lift of FIG. 1 in another stage of deployment.
Figure 6:
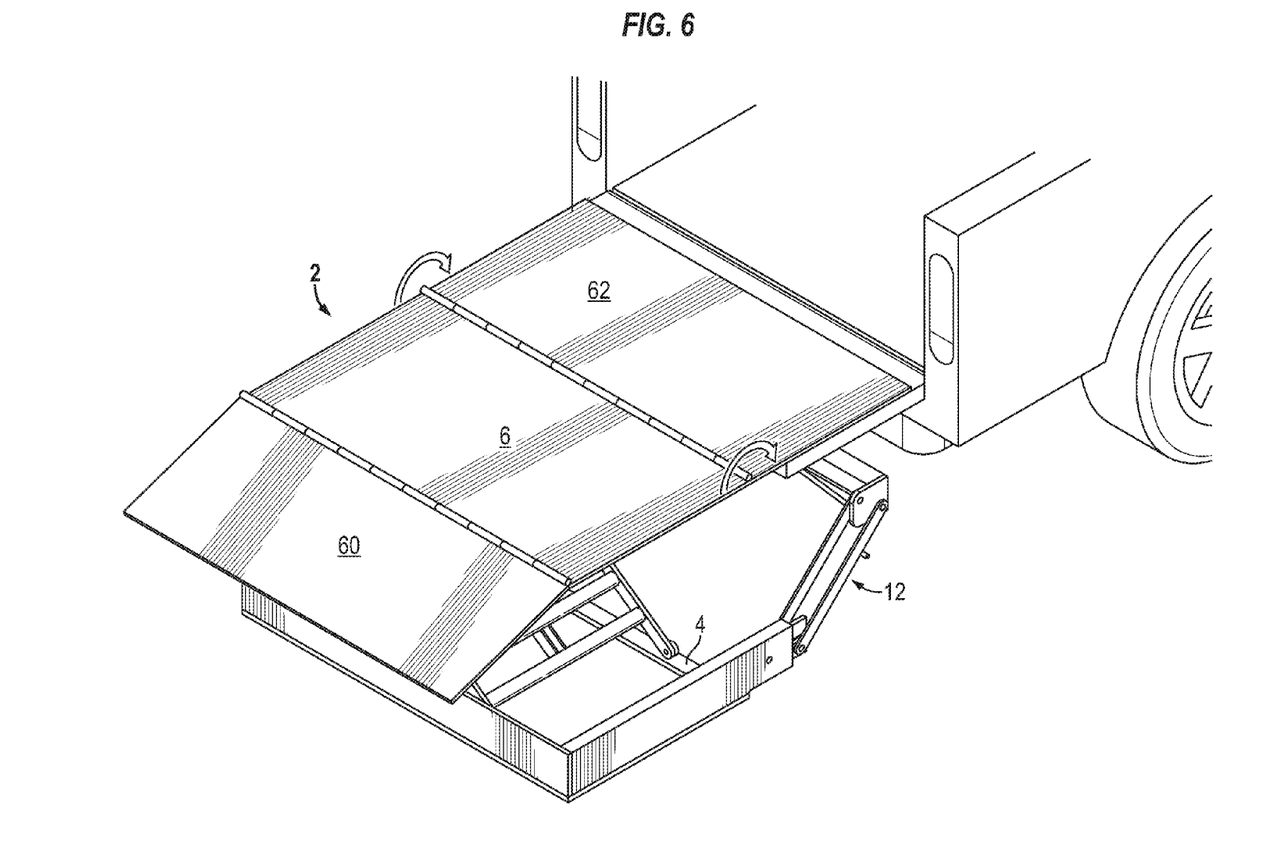
FIG. 6 is an isometric view of the cargo lift of FIG. 1 in another stage of deployment.

With reference to FIG. 5, in a preferred embodiment, a ramp plate 60 is hingedly connected to a first side edge of the platform and a bridge plate 62 is hingedly connected to a second side edge of the platform. The ramp plate and bridge plate preferably fold flat over the top of the platform for travel. The bridge plate preferably has a fixture to temporarily lock it in a vertical position when the platform is being raised or lowered. The ramp plate has a fixture to temporarily lock it in a slightly depending position when the platform is being raised or lowered. Extendable handles (not shown) can be attached to the frame or the sliders to add stability if a person is using the platform as a step or as a lift. It is further preferred that friction reducing elements 66, 66' be mounted on the second brackets to reduce friction between the sliders and the four-bars. Nylon blocks or rollers are suitable. See FIG. 3. It is further preferred that the actuator be a linear actuator acting to change the variable angle between the crossed bars and thereby raise and lower the platform. It can be of the manual or electric rotary type, for example, leadscrew, ballscrew, linear electric cylinder, hydraulic cylinder, gearmotor, etc. Electric drives could be powered from the vehicle via a plug or by an optional on-board battery and controlled via a pendant controller hard wired to the scissor lift or with a removable plugged connection. The pendant controller could have separate up and down buttons or a rocker switch.

The lift is used by pulling the travel pin(s) from the slider(s) and pulling the slider/frame/scissor/platform assembly away from the truck until the pivot assemblies release. The slider/frame/scissor/platform assembly is then lowered to the ground, the ramps unfolded, the truck tailgate lowered, and the load is placed on the platform. The scissor jack is then actuated to raise the platform to near the level of the tailgate and the bridge ramp is folded over the tailgate. The load can then be shifted into the truck bed, the ramps folded down onto the platform, the tailgate closed, the platform lowered, the slider/frame/scissor/platform assembly raised to the level of the receiver hitch, slid back to the truck, and secured with the travel pin(s).

If desired, the probe connector 16 can be provided with a lockable hinge (not shown) so that the platform assembly can be folded up and stowed in a vertical position for road transport on the back of a vehicle. The platform can also be provided with an opposed pair of raise-able side flaps (not shown) attached in a similar manner as ramps 60 and 62 to form side fences so that the platform is better suited for use as a cargo rack when in the horizontally stowed (FIG. 1) position. Further, at least one removable tubing (not shown) can extend upwardly from the platform to form a hand-hold in the event that the platform is used as a human lift. The platform can be provided with an aperture to mount the tubing and clips provided on the side of the assembly to stow it. In another embodiment, at least one of the ramp plate 60 and the bridge plate 62 are slidably received by the platform assembly, or a single plate that slides all the way through the assembly functions at different times as either ramp plate or bridge plate.

While certain preferred embodiments of the invention have been described herein, the invention is not to be construed as being so limited, except to the extent that such limitations are described by the claims.

What is claimed is:

1. Apparatus comprising
   a probe connector for receipt by a receiver hitch, said probe connector having a first end and a second end;
   a crossbar connected to the first end of the probe connector, said crossbar having a first end, a second end and a mid section, said probe connector being connected to the mid section of the crossbar and extending generally at a right angle therefrom,
   a first four-bar attached to the first end of the crossbar; said first four-bar comprising a first linkage, a second linkage, a third linkage and a fourth linkage, pivotally connected, said first and third linkages being in the form of a first bracket and a second bracket, said second and fourth linkages being in the form of elongated parallel bars, the first bracket of the first four-bar being attached to the first end of the crossbar; the elongated parallel bars extending at a right angle to the crossbar generally in a direction opposite from the probe connector;
   a second four-bar attached to the second end of the crossbar; said second four-bar comprising a first linkage, a second linkage, a third linkage and a fourth linkage, pivotally connected, said first and third linkages being in the form of a first bracket and a second bracket, said second and fourth linkages being in the form of elongated parallel bars, the first bracket of the second four-bar being attached to the second end of the crossbar; the elongated parallel bars extending at a right angle to the crossbar, the elongated parallel bars of the second four-bar being parallel to the elongated parallel bars of the first four-bar;

wherein the second bracket of each of the first and second four-bar has a pair of legs interconnected by a nose piece, the linkages being pivotally attached to the legs so that the nose piece of each bracket stays parallel to the probe connector;

a first and a second slider element mounted telescopingly on the first and the second four-bars, respectively, each slider element movable from a first position in which the four-bars are immobilized to a second position in which the four-bars are released for motion and the slider elements are mounted telescopingly only on the nose pieces of the second brackets of the first and second four-bars;

a frame connecting the first slider element to the second slider element, a platform positioned parallel to the frame, a scissor lift mechanism connecting the frame and the platform, and an actuator operatively connected to the scissor lift mechanism to raise and lower the platform.

2. Apparatus as in claim 1 wherein the first and second slider elements each has a first end and a second end and, when the slider elements are in the second position, the second end of each slider element is mounted telescopingly only on the nose piece of the second brackets of the first and second four-bars, said apparatus further comprising a pin mounted at least partially through at least one of the slider elements near the second end to stop against a portion of the second bracket and limit travel of the slider elements.

3. Apparatus as in claim 2 further comprising a biasing means connecting the cross-bar and at least one of the four-bars to bias the four-bars toward a configuration parallel to the probe connector.

4. Apparatus as in claim 3 wherein the biasing means comprises a pair of torsion bars each having a first end arm connected to the cross-bar and a second end arm contacting a four-bar linkage.

5. Apparatus as in claim 1 wherein the scissor lift mechanism comprises two pairs of pivotally crossed bars crossing each other at a variable angle, one bar of each pair being pivotally connected to the frame, the other bar of each pair being pivotally connected to the platform.

6. Apparatus as in claim 1 further comprising a ramp plate hingedly connected to a first side edge of the platform and a bridge plate hingedly connected to a second side edge of the platform.

7. Apparatus as in claim 1 further comprising friction reducing elements mounted on the second brackets to reduce friction between the sliders and the four-bars.

8. Apparatus as in claim 5 wherein the actuator is a linear actuator acting to change the variable angle between the crossed bars and thereby raise and lower the platform.

9. Apparatus comprising
a frame,
a platform,
a scissor lift mechanism between the frame and the platform,
an actuator for the scissor lift mechanism,
a pair of pivot mechanisms to raise and lower the frame between ground level and receiver hitch level while maintaining the platform in a horizontal position,
a pair of sliding guide members alongside the frame attaching the frame to the pivot mechanisms,
a probe connector for a receiver hitch, and
a cross-bar attaching the pair of pivot mechanisms to the probe connector.

10. Apparatus as in claim 9 wherein
the pair of sliding guide members slide back and forth over the pivot mechanisms to adjust distance between the platform and the cross-bar.

11. Apparatus as in claim 10 wherein the pivot mechanisms are four-bars.

12. Apparatus as in claim 11 wherein the sliding guide members at least partly surround the four-bars to block pivot action of the four-bars until the sliding guide members are fully pulled away from the cross-bar to expose the four-bars.

13. Apparatus as in claim 12 wherein the sliding guide members carry a pin to prevent accidental separation from the four bars.

14. Apparatus as in claim 13 further comprising a biasing means arranged to resist the frame being lowered to ground level.

15. Apparatus as in claim 9 wherein
a scissor lift mechanism between the frame and the platform comprises two pairs of pivotally crossed bars that cross at a variable angle, each bar having a pivotally affixed end and a rolling end, and
the actuator for the scissor lift mechanism comprises a linear actuator that adjusts the angle to raise and lower the platform.

* * * * *